United States Patent [19]

Balaba et al.

[11] Patent Number: 4,785,049

[45] Date of Patent: Nov. 15, 1988

[54] FORMING CLEAR GEL AND TRANSPARENT FILM BY REACTING ALUMINA HYDRATE WITH VINYL ALCOHOL-VINYL ACETATE COPOLYMER

[75] Inventors: Willy M. Balaba, Monroeville; Gary J. DiFranco, Plum Borough both of Pa.

[73] Assignee: Aluminum Company of America, Pittsburgh, Pa.

[21] Appl. No.: 78,457

[22] Filed: Jul. 27, 1987

[51] Int. Cl.$^4$ .......................... C08K 3/22; C08L 29/04
[52] U.S. Cl. ...................................... 525/61; 524/430; 524/437; 524/557
[58] Field of Search .......................... 525/61; 502/508; 524/430, 437, 557

[56] References Cited

U.S. PATENT DOCUMENTS

| | | | |
|---|---|---|---|
| 3,417,028 | 12/1968 | Montgomery et al. | 252/317 |
| 3,839,307 | 10/1974 | Schmifg | 525/61 |
| 3,993,590 | 11/1976 | Andre et al. | 252/430 |
| 4,104,208 | 8/1978 | Kido et al. | 525/61 |

FOREIGN PATENT DOCUMENTS 786346  11/1957  United Kingdom .................. 525/61

*Primary Examiner*—Allan M. Lieberman
*Attorney, Agent, or Firm*—Glenn E. Klepac

[57] ABSTRACT

A stable gel is formed by reacting alumina hydrate sol and a vinyl alcohol-vinyl acetate copolymer in an aqueous solution having pH less than about 7 to form a polymeric sol and then transforming the sol to a gel. The copolymer preferably comprises polyvinyl acetate that is about 85–99% hydrolyzed. The gel is drawn into a thin layer and water is removed to form a thin, substantially crack-free film. The film makes a stable, generally transparent insulating material.

19 Claims, No Drawings

FORMING CLEAR GEL AND TRANSPARENT FILM BY REACTING ALUMINA HYDRATE WITH VINYL ALCOHOL-VINYL ACETATE COPOLYMER

FIELD OF THE INVENTION

The present invention relates to alumina-polymer gels and films and to methods for their preparation.

BACKGROUND OF THE INVENTION

Gels comprising alumina combined with various organic substances are known in the prior art. However, such gels generally take the form of a white floc rather than a stable clear gel.

For example, Montgomery et al U.S. Pat. No. 3,417,028 claims addition of polyvinyl alcohol, polyethylene glycols, polyethylene oxides, methyl celluloses, and polyacrylamides to solutions containing alumina hydrate. The organic polymers were reacted with the alumina in solutions made basic by addition of ammonium hydroxide. Because the reaction was carried out in basic solution, the products were white flocs rather than clear gels even though the patent refers to such products as "gels" or "hydrous gels".

Andre et al U.S. Pat. No. 3,993,590 describes a process for preparing silica-alumina beads by polymerizing alumina and silica precursors with a water-soluble monomer comprising an acrylic compound. The reaction is carried out in an aqueous mixture preferably having a pH of about 3-4. One of the alumina precursors is an alumina hydrosol made by hydrolyzing an aluminum alcoholate or other water-soluble aluminum compound. A preferred monomer is acrylic acid. The polymerization reaction product comprises beads which are washed, dried, and calcined to destroy organic matter.

Andre et al do not suggest substituting a vinyl alcohol-vinyl acetate copolymer for the acrylic monomers preferred for their polymerization reaction. Addition of an organic plasticizer to the reaction mixture described above would be inconsistent with their ultimate objective of producing calcined alumina-silica beads which are free of any organic matter. Andre et al do not teach or suggest the toughened gel and substantially crack-free film claimed herein.

As used herein, the terms "monolithic gel" and "stable gel" refer to a gelled mass characterized by substantially no separation of a liquid phase. The term "floc" refers to a combination or aggregation of suspended particles in such a way that they form small clumps or tufts. A stable gel made in accordance with the present invention is generally transparent or slightly opalescent whereas an alumina hydrate floc is generally white. The term "gel" is often used in the prior art to describe what is called a floc herein.

The expression "alumina hydrate" refers to $Al_2O_3 \cdot x\ H_2O$, wherein x varies from 1 to 3. In other words, the water of the alumina hydrate varies from 15.0 to 34.6 percent by weight of the alumina hydrate, determined by calcination at 538° C. (1000° F.) for one hour.

It is a principal objective of the present invention to provide a method for preparing a stable clear gel comprising alumina hydrate combined with a vinyl alcohol-vinyl acetate copolymer.

A related objective of the invention is to provide a stable monolithic gel comprising alumina hydrate combined with a vinyl alcohol-vinyl acetate copolymer.

A further objective of the invention is to provide a method for transforming the clear gel of the invention into a crack-free, generally transparent film.

Additional objects and advantages of the present invention will become apparent to persons skilled in the art from the following specification and claims.

SUMMARY OF THE INVENTION

In accordance with the present invention, alumina hydrate is combined with an organic polymer to form a stable clear gel. The gel is produced by a method comprising the steps of (a) preparing a sol comprising a colloidal dispersion of alumina hydrate in an aqueous medium, (b) mixing said sol with an organic polymer comprising a water-soluble vinyl alcohol-vinyl acetate copolymer, (c) reacting said alumina hydrate with said organic polymer in an aqueous solution having a pH of less than about 7, thereby to form a polymeric sol, and (d) transforming the polymeric sol to a stable clear gel.

A water-soluble plasticizer is preferably added to the polymeric sol before it is converted to a gel. The plasticizer may be diethylene glycol (DEG) or polyethylene glycol (PEG) or mixtures thereof. Diethylene glycol is particularly preferred.

The vinyl alcohol-vinyl acetate copolymer is made by partially hydrolyzing polyvinyl acetate in a basic solution. The polyvinyl acetate is generally hydrolyzed about 85–99%. About 87–97% hydrolysis is preferred. Polymers with about 88% and about 96% hydrolysis have been found quite suitable.

The copolymer generally has a molecular weight of greater than about 25,000, preferably greater than about 50,000 and more preferably greater than about 100,000. Two preferred copolymers have molecular weights of about 95,000 and about 126,000, respectively.

The alumina hydrate sol is preferably prepared by hydrolyzing an aluminum alkoxide in an aqueous acidic solution. A preferred aluminum alkoxide is aluminum isopropoxide.

The alumina hydrate sol and organic polymer are preferably reacted at an elevated temperature of about 50°–100° C. A reaction temperature of about 81° C. is particularly preferred. The reaction is carried out in an aqueous solution having a pH of less than about 7. The pH is preferably about 3–6.

The step of transforming the polymeric sol to a stable clear gel preferably comprises concentrating the sol by evaporation of water. For example, the sol may be concentrated in a rotary evaporator to about one-half of its initial volume.

A preferred gel made in accordance with the invention is nearly transparent. At room temperature, the gel retained its appearance with no syneresis for several weeks. The gel is stable upon heating to 100° C.

The gel may be converted into transparent film by drawing a thin layer onto an inert substrate and then drying at an elevated temperature of about 40°–100° C. A particularly preferred drying temperature is about 80° C. The layer has a thickness of less than about one millimeter, preferably less than about one-half millimeter and more preferably less than about 100 microns (0.1 mm). One suitable film has a thickness of about 25 microns.

The stable gel and transparent film of the invention are useful as transparent insulating materials. The gel may also be dried and calcined to form a catalyst base.

DETAILED DESCRIPTION OF PREFERRED EMBODIMENTS

The preferred method and products of the present invention are described below with reference to some preferred examples.

An aqueous alumina hydrate sol was prepared by dissolving 20.4 g of aluminum isopropoxide in 195 ml distilled water and 5 ml of 50 vol% aqueous acetic acid, all in an Erlenmeyer flask. The flask contents were stirred at room temperature for various times (0-24 hours), at the end of which period an appropriate copolymer was added. The effects of different prestirring times upon thermal stability of the resulting gel product are shown by test results summarized in Table II below. The flask contents were heated with stirring at 81° C. for 21 hours to form a sol, after which the sol was allowed to cool under continued stirring.

Formulations were made by blending 50 ml of the sol described above, 5 ml of methyl ethyl ketone (MEK), 5 ml of acetone, and 10 ml of a diethylene glycol plasticizer in a flask at 86° C. Alternatively, 10 ml of polyethylene glycol may be substituted for the diethylene glycol. Test results summarized in Table I below show the effects of different plasticizers. The flask contents were then concentrated with a rotary evaporator to half volume, thereby forming a gel.

The gel was drawn into a film on a polytetrafluoroethylene substrate using a draw/down bar having a 20 micron clearance. The substrate and film were oven dried at 80° C. for one hour and allowed to cool at room temperature. The film was next peeled off the substrate and conditioned at 25° C. and 50% relative humidity. Various tests were then performed on the films.

Different formulations were made with vinyl alcohol-vinyl acetate copolymers designated as Copolymer B and Copolymer C. Copolymer B was 88% hydrolyzed, had a molecular weight of about 126,000, and an intrinsic viscosity of about 1.18 dL/g. Copolymer C was about 96% hydrolyzed, had a molecular weight of about 95,000, and an intrinsic viscosity of about 0.7 dL/g.

Fracture stress and elongation-to-failure determinations were performed with standard methods (ASTM D-882) on an Instron machine. The Instron machine was set at a crosshead speed of 50.8 cm (20 inches) per minute and a 5.08 cm (2 inches) gauge length. Stress to fracture and ultimate strain were measured on gels made with Copolymers B and C and with polyethylene glycol (PEG) and diethylene glycol (DEG) plasticizers. The polyethylene glycol had an average molecular weight of about 190-210. Results of the tests are shown in Table I.

TABLE I
Mechanical Strength Properties of Toughened Gels

| Copolymer | Plasticizer | Stress to Fracture ($10^{-3}$ psi) | Ultimate Strain (%) |
|---|---|---|---|
| 20 wt % B | PEG | 0.426 | 73.2 |
| 20 wt % B | DEG | 0.780 | 123.4 |
| 10 wt % B | DEG | 0.380 | 125.0 |
| 20 wt % C | PEG | 0.300 | 49.4 |
| 20 wt % C | DEG | 1.070 | 120.8 |
| 10 wt % C | DEG | 0.694 | 20.2 |

The test results in Table I indicate that substantially crack-free films having satisfactory toughness can be made with gels containing 20 wt. % of either copolymer. The polymeric film made with 20 wt. % Copolymer C and diethylene glycol performed best. It was not possible to obtain films at copolymer concentrations below 10 wt. %.

Thermal stability of the gels was tested in air using a DuPont 9900 thermal analyzer at a heating rate of 20° C. per minute. Measurements were made to determine the temperature at which 10% weight loss occurred. This temperature varied widely, depending upon length of time of prestirring for the aluminum isopropoxide solution. The gels tested were made with 20 wt. % of Copolymer B or Copolymer C and diethylene glycol as a plasticizer. Results are shown in Table II.

TABLE II
Effect of Prestirring Time on Thermal Stability of Gel

| Prestirring Time (hours) | Temperature at 10% weight loss (°C.) | |
|---|---|---|
| | Copolymer B | Copolymer C |
| 0 | 311.1 | 199.0 |
| 1 | 162.8 | 123.0 |
| 2 | 128.5 | 151.9 |
| 3 | 151.9 | 116.1 |
| 24 | 126.6 | 155.6 |

Test results shown in Table II suggest that gel samples made with the 88% hydrolyzed polymer (Copolymer B) had greater thermal stability than samples made with the 96% hydrolyzed polymer (Copolymer C). These results may be explained by the higher molecular weight of Copolymer B.

Room temperature prestirring of the aluminum alkoxide sol prior to addition of a copolymer has a negative effect on gel thermal stability compared with substantially simultaneous introduction of the isopropoxide and copolymer. The inventors believe that when the isopropoxide and copolymer are introduced together, simultaneous exchange occurs between hydroxyl groups on the polymer and the isopropoxide. Such interaction leads to cross-linking by ionic or weakly covalent bonding and a consequent enhancement of thermal stability. On the other hand, stirring in the absence of copolymer allows the alkoxide to hydrolyze to aluminum hydroxide. The principal interaction between aluminum hydroxide and the copolymer would then be through hydrogen bonding.

The effect of isopropoxide solution prestirring time on optical clarity of the gels was also tested. Clarity/transparency tests were made at 500 nm according to ASTM D-1746-70 using a Beckman UV-visible spectrometer. The gels tested were made with 20 wt. % Copolymer B or C, using diethylene glycol as the plasticizer. Results of the tests are shown in Table III.

TABLE III
Effect of Prestirring Time on Optical Clarity of Gels

| Prestirring Time (hours) | Light Transmission at 500 nm, % | |
|---|---|---|
| | Copolymer B | Copolymer C |
| 0 | 29.85 | 50.96 |
| 1 | 62.28 | 58.00 |
| 2 | 65.02 | 72.91 |
| 3 | 62.46 | 72.34 |
| 24 | 72.75 | 78.94 |

These results show that stirring and its duration have a pronounced effect on optical clarity. The effect of prestirring and the observation that gels made with the copolymer having more hydroxyl groups (Copolymer C) demonstrate higher clarity, together indicate that alkoxide hydrolysis plays a role in producing clearer gels. The alumina hydrate sol particles produced by such hydrolysis may have enhanced compatibility with the hydroxyl group-carrying polymer, thus giving clearer gel samples.

While the invention has been described in terms of preferred embodiments, the claims appended hereto are intended to encompass all embodiments which fall within the spirit of the invention.

What is claimed is:

1. A method for preparing a stable gel comprising alumina hydrate combined with a water-soluble partially hydrolized polyvinyl acetate polymer, said method comprising
   (a) preparing a sol comprising a colloidal dispersion of alumina hydrate in an aqueous medium,
   (b) mixing said sol with a water-soluble partially hydrolyzed polyvinyl acetate polymer comprising about 85-99% vinyl alcohol groups,
   (c) reacting said alumina hydrate with said copolymer in an aqueous solution having a pH of less than about 7, thereby to form a polymeric sol comprising alumina hydrate combined with the said polymer, and
   (d) transforming the polymeric sol to a stable gel by eliminating the aqueous dispersion medium.

2. The method as claimed in claim 1 further comprising, before transforming step (d),
   (e) adding to the sol a water-soluble plasticizer selected from the group consisting of diethylene glycol, polyethylene glycol and mixtures thereof.

3. The method as claimed in claim 2 wherein the plasticizer is diethylene glycol.

4. The method as claimed in claim 1 wherein the polyvinyl acetate is about 87-97% hydrolyzed.

5. The method as claimed in claim 1 wherein the molecular weight of the polymer is greater than about 50,000.

6. The method as claimed in claim 1 wherein the molecular weight of the polymer is greater than about 100,000.

7. The method as claimed in claim 1 wherein step (a) includes hydrolyzing an aluminum alkoxide in an aqueous acidic solution to form a sol.

8. The method as claimed in claim 1 wherein step (c) is performed at an elevated temperature of about 50°-100° C.

9. The method as claimed in claim 1 wherein steps (a) and (b) are performed substantially simultaneously.

10. The method as claimed in claim 1 wherein step (d) is performed by removing water from the polymeric sol.

11. The method of claim 2 wherein the polymeric sol of step (c) comprises at least 10 wt. % of the polymer, said method further comprising the formation of a film by
    (f) drawing the gel into a layer having a thickness of less than about one millimeter, and
    (g) removing any remaining water from the gel layer.

12. The method of claim 11 wherein step (g) comprises heating the gel layer at an elevated temperature.

13. A stable clear gel comprising alumina hydrate combined with a water-soluble partially hydrolyzed polyvinyl acetate polymer, said gel being formed by the method of claim 1.

14. The gel of claim 11 having at least about 50% light transmission at 500 nm.

15. A substantially crack-free film formed by the method of claim 11.

16. A substantially crack-free film formed by the method of claim 12.

17. A stable gel prepared in an aqueous solution having a pH less than about 7, said gel being the reaction product of an alumina hydrate sol and a water-soluble partially hydrolyzed polyvinyl acetate polymer comprising about 85-99% vinyl alcohol groups.

18. A transparent, thin, crack-free film formed by the steps of
    (a) forming a polymeric sol by reacting an alumina hydrate sol and a water-soluble partially hydrolyzed polyvinyl acetate polymer in an aqueous solution containing a water-soluble plasticizer and having pH less than 7, wherein said solution contains at least 10 wt. % of a polymer comprising about 85-99% vinyl alcohol groups,
    (b) transforming the sol to a gel by eliminating the aqueous dispersion medium,
    (c) drawing the gel into a thin layer, and
    (d) removing any remaining water from the thin layer, thereby to form a thin film.

19. The film of claim 18 wherein said plasticizer is selected from the group consisting of diethylene glycol, polyethylene glycol and mixtures thereof.

* * * * *